US008687100B2

(12) United States Patent
Toyama et al.

(10) Patent No.: US 8,687,100 B2
(45) Date of Patent: Apr. 1, 2014

(54) SOLID-STATE IMAGING DEVICE, METHOD OF DRIVING THE DEVICE, AND CAMERA SYSTEM WITH VARIED TIMING OF SAMPLING PERIOD FOR SAMPLING A BIAS VOLTAGE DURING PIXEL READOUT

(75) Inventors: Takayuki Toyama, Kanagawa (JP); Hiroyuki Iwaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 597 days.

(21) Appl. No.: 12/923,915

(22) Filed: Oct. 14, 2010

(65) Prior Publication Data

US 2011/0115959 A1 May 19, 2011

(30) Foreign Application Priority Data

Nov. 13, 2009 (JP) ................................. 2009-260488

(51) Int. Cl.
*H04N 3/14* (2006.01)
*H04N 5/335* (2011.01)

(52) U.S. Cl.
USPC .......................................................... 348/308

(58) Field of Classification Search
USPC ........... 341/155, 164–165, 126; 348/241, 308
See application file for complete search history.

(56) References Cited

U.S. PATENT DOCUMENTS

| 7,265,329 | B2 * | 9/2007 | Henderson et al. | ......... 250/208.1 |
|---|---|---|---|---|
| 7,755,688 | B2 * | 7/2010 | Hatano et al. | ................. 348/300 |
| 7,911,519 | B2 * | 3/2011 | Saito et al. | .................... 348/294 |
| 8,115,842 | B2 * | 2/2012 | Lebouleux et al. | ........... 348/294 |
| 8,269,872 | B2 * | 9/2012 | Okumura | ...................... 348/308 |
| 8,310,580 | B2 * | 11/2012 | Suzuki et al. | ................. 348/308 |
| 2005/0195304 | A1 | 9/2005 | Nitta et al. | |
| 2005/0269609 | A1 * | 12/2005 | Henderson | ..................... 257/292 |
| 2006/0049334 | A1 * | 3/2006 | Henderson et al. | ......... 250/208.1 |
| 2008/0055432 | A1 * | 3/2008 | Koseki | ........................... 348/241 |
| 2008/0055445 | A1 * | 3/2008 | Hatano et al. | ................. 348/302 |
| 2011/0019039 | A1 * | 1/2011 | Ikuma et al. | ................... 348/246 |

FOREIGN PATENT DOCUMENTS

JP          2005-278135          10/2005

OTHER PUBLICATIONS

W. Yang et al., "An Integrated 800×600 CMOS Imaging System," ISSCC Digest of Technical Papers, pp. 304-305, Feb. 1999.

* cited by examiner

*Primary Examiner* — Gary C Vieaux
(74) *Attorney, Agent, or Firm* — Rader, Fishman & Grauer PLLC

(57) ABSTRACT

A solid-state imaging device includes: a pixel section formed by pixels performing photoelectric conversion arranged in a matrix; a pixel signal readout section capable of column-parallel processing including an A/D conversion function for reading out a pixel signal from the pixel section and performing analog-digital conversion of the signal, the pixels being read in groups; a voltage sampling section sampling a bias voltage generated by an internal or external voltage generating circuit for a period in accordance with a control signal and supplying the sampled bias voltage to the pixel signal readout section; and a control section controlling the signal readout operation of the pixel signal readout section and the voltage sampling operation of the voltage sampling section. The pixel signal readout section includes a functional portion. The control section exercises control such that the voltage sampling operation is performed in a period other than at least either of a period in which an analog signal is read out or in which A/D conversion is carried out.

17 Claims, 11 Drawing Sheets

SOLID-STATE IMAGING DEVICE, METHOD OF DRIVING THE DEVICE, AND CAMERA SYSTEM WITH VARIED TIMING OF SAMPLING PERIOD FOR SAMPLING A BIAS VOLTAGE DURING PIXEL READOUT

BACKGROUND OF THE INVENTION

1. Field of the Invention

The present invention relates to a solid-state imaging device from which data is read out on a column-parallel basis, a method of driving the device, and a camera system having the device.

2. Description of the Related Art

A CMOS image sensor can be manufactured using manufacturing processes similar to those used for common CMOS integrated circuits. A CMOS image sensor can be driven by a single power source and can be consolidated with analog circuits and logic circuits manufactured using CMOS processes into a single chip.

Thus, CMOS image sensors have a multiplicity of significant advantages including the fact that they can be implemented in combination with a small number of peripheral ICs.

It is the main trend in the related art to use one-channel (ch) output type CCD output circuits utilizing an FD amplifier having a floating diffusion (FD) layer.

On the contrary, CMOS image sensors include an FD amplifier provided at each pixel, and the main stream of this category is column-parallel output type products in which a certain row of a pixel array is selected and pixels in the row are simultaneously read in the direction of columns.

The reason for adopting such a configuration is as follows. It is difficult to obtain a sufficient driving capability from FD amplifiers provided in pixels alone. Therefore, a need for a reduced data rate arises, and parallel processing is considered advantageous at a low data rate.

A variety of proposals have been made on circuits to be used for reading out (outputting) pixel signals from column-parallel output type CMOS image sensors.

One of the most advanced types of such circuits is the type in which an analog-digital converter (hereinafter abbreviated as "ADC") is provided for each column to obtain pixel signals from the column as digital signals.

For example, CMOS image sensors having such column-parallel type ADCs incorporated therein are disclosed in W. Yang et. al., "An Integrated 800×600 CMOS Image System", ISSCC Digest of Technical Papers, pp. 304-305, February, 1999 (Non-Patent Document 1) and JP-A-2005-278135 (Patent Document 1).

FIG. 1 is a block diagram showing an exemplary configuration of a solid-state imaging device (CMOS image sensor) 1 having column-parallel type ADCs incorporated therein.

As shown in FIG. 1, the solid-state imaging device 1 includes a pixel section 2, a vertical scan circuit (scan circuit) 3, a horizontal transfer scan circuit (column scan circuit) 4, a load circuit 5, and column-parallel processing section 6 formed by a group of ADCs.

Further, the solid-state imaging device 1 includes a digital-analog converter (hereinafter abbreviated as "DAC") 7, an internal voltage generating circuit 8, and a timing control circuit 9.

The pixel section 2 is formed by disposing unit pixels 21 in the form of a matrix, each unit pixel including a photodiode (photoelectric conversion device) and an in-pixel amplifier.

In the pixel section 2, unit pixels 21 arranged in the same row are connected to the same row control line CTL, and unit pixels 21 arranged in the same column are connected to vertical signal lines 10-1 to 10-n for reading out signals.

The load circuit 5 includes load MOS transistors 51-1 to 51-n which are provided in association with columns of pixel alignment and which are connected to the vertical signal lines 10-1 to 10-n, respectively at the drains thereof and connected to a reference potential VSS at the sources thereof.

The gates of the load MOS transistors 51-1 to 51-n are connected to a supply line of a bias voltage VBIAS1 generated by the internal voltage generating circuit 8.

The load MOS transistors 51-1 to 51-n serve as current sources of source followers when pixels are read out.

The column-parallel processing section 6 includes a plurality of column processing circuits 61 each of which constitutes an ADC associated with a column of pixels.

Each of the column processing circuits (ADC) 61 includes a comparator 61-1 which compares a reference signal RAMP (Vslop) and an analog signal Vsl obtained from the respective pixel on each row line through the vertical signal line where the reference signal RAMP is a ramp waveform obtained by varying a reference signal generated by the DAC 7 stepwise.

Further, each of the column processing circuit 61 includes a counter 61-2 counting the time of the comparison carried out by the comparator 61-1 and a memory (latch) 61-3 holding the result of the counting carried out by the counter 61-2. The column processing circuit 61 also includes a transfer switch 61-4.

A bias voltage VBIAS3 input through an external bias input terminal T1 is supplied to the gate of a transistor serving as a current source of differential pair transistors of the comparator 61-1.

The column processing circuits 61 have an n-bit digital signal converting function, and one circuit 61 is disposed on each of the vertical signal lines (column lines) 10-1 to 10-n to form a column-parallel ADC block.

The output of each memory 61-3 is connected to the horizontal transfer line 11 which has a width of, for example, k bits.

K amplifier circuits (not shown) are provided in association with the horizontal transfer line 11.

A bias voltage VBIAS2 generated by the internal voltage generating circuit 8 is supplied to the DAC 7. The DAC 7 generates the reference signal RAMP (Vslop) which is a ramp waveform obtained by varying a reference signal stepwise and supplies the signal to the comparator 61-1 of each column processing circuit 61.

The timing control circuit 9 controls the timing of processes performed by the vertical scan circuit 3, the horizontal transfer scan circuit 4, the column-parallel processing section 6, and the DAC 7.

FIG. 2 is a timing chart of the circuits shown in FIG. 1.

At each column processing circuit (ADC) 61, an analog signal (potential Vsl) read out to the vertical signal line 10 is compared with the stepwise-varying reference signal RAMP (Vslop) at the comparator 61-1 disposed in the column.

At this time, the counter 61-2 keeps on counting until the levels of the analog potential Vsl and the reference signal RAMP (Vslop) cross each other to invert the output of the comparator 61-1, and the potential (analog signal) Vsl on the vertical signal line 10 is converted into a digital signal (A/D conversion takes place).

The A/D conversion takes place twice at each readout cycle.

The first A/D conversion takes place when a reset level (P-phase) of the unit pixels 21 is read out to the vertical signal lines 10 (10-1 to 10-n).

The reset level (P-phase) of each pixel has some variation.

The second A/D conversion takes place when signals obtained by photoelectric conversion performed at the unit pixels 21 are read out to the vertical signal lines 10 (10-1 to 10-n) (D-phase).

Since the D-phase level of each pixel also has some variation, levels in the P-phase are subtracted from levels in the D-phase, whereby correlated double sampling (CDS) is carried out.

Digital signals obtained by the conversion described above are recorded in the memories 61-3 and sequentially read out by the horizontal (column) transfer scan circuit 4 into an amplifier circuit through the horizontal transfer line 11, and the signals are finally output from the amplifier circuit.

A column-parallel output process is carried out as thus described.

The counting process of the counters 61-2 in the P-phase is referred to as "first-order sampling", and the counting process of the counters 61-2 in the D-phase is referred to as "second-order sampling".

SUMMARY OF THE INVENTION

The trend toward amplification type solid-state imaging devices having a greater number of pixels and a smaller size is accompanied by a trend toward smaller unit cell sizes.

As a result, the amount of a pixel signal becomes small relative to the amount of circuit noise. Then, internal circuit noise of such a device and noise entering the device from outside have non-negligible influence on image quality.

In a CMOS type solid-state imaging device from which data is read out on a column-parallel basis as described above, bias voltages used in the load circuit 5 and the DAC 7 are supplied directly from the internal voltage generating circuit 8 as shown in FIG. 1.

At this time, circuit noise generated in the internal voltage generating circuit 8 and external noise coming from outside the device can enter the column circuit to degrade image quality.

One approach toward the elimination of such a problem is to add an external capacity to the device to place a bandwidth restriction on the same. However, such an approach can result in problems such as an increase in the number of external components, insufficient voltage convergence at the time of activation of the device, and insufficient suppression of low frequency band noise.

Under the circumstance, it is desirable to provide a solid-state imaging device in which noise degrading image quality can be prevented from entering a column processing section, such noise including circuit noise generated in a bias voltage generating circuit and external noise coming from outside the device without adding an external capacitor. It is also desirable to provide a method of driving the device and a camera system including the device.

According to an embodiment of the invention, there is provided a solid-state imaging device including a pixel section formed by a plurality of pixels performing photoelectric conversion arranged in the form of a matrix, a pixel signal readout section capable of column-parallel processing including an A/D conversion function for reading out a pixel signal from the pixel section and performing analog-digital conversion of the signal, the pixels being read in groups; a voltage sampling section sampling a bias voltage generated by an internal or external voltage generating circuit for a period in accordance with a control signal and supplying the sampled bias voltage to the pixel signal readout section; and a control section controlling the signal readout operation of the pixel signal readout section and the voltage sampling operation of the voltage sampling section. The pixel signal readout section includes a functional portion operating when supplied with the internally or externally generated bias voltage. The control section exercises control such that the voltage sampling operation of the voltage sampling section is performed in a period other than at least either of a period in which an analog signal is read out and a period in which A/D conversion is carried out.

According to another embodiment of the invention, there is provided a method of driving a solid-state imaging device including the steps of reading out pixel signals from a plurality of pixels of a pixel section which includes a functional portion operating when supplied with an internally or externally generated bias voltage and which is formed by a plurality of pixels performing photoelectric conversion arranged in the form of a matrix, the pixels being read in groups; performing a column-parallel process including an analog-digital conversion function for converting the pixel signals into digital signals, the step involving a functional portion operating when supplied with an internally or externally generated bias voltage; sampling a bias voltage generated by an internal or external voltage generating circuit for a period according to a control signal and supplying the sampled bias voltage to the functional portion involved in at least either of the signal readout step and the column-parallel processing step; and controlling the voltage sampling operation at the voltage sampling step. At the control step, control is exercised such that the voltage sampling at the voltage sampling step is performed in a period other than either of the analog signal readout period and the A/D conversion period.

According to still another embodiment of the invention, there is provided a camera system including a solid-state imaging device; and an optical system forming an image of an object on the solid-state imaging device. The solid-state imaging device includes a pixel section formed by a plurality of pixels performing photoelectric conversion arranged in the form of a matrix; a pixel signal readout section capable of column-parallel processing including an A/D conversion function for reading out a pixel signal from the pixel section and performing analog-digital conversion of the signal, the pixels being read in groups; a voltage sampling section sampling a bias voltage generated by an internal or external voltage generating circuit for a period in accordance with a control signal and supplying the sampled bias voltage to the pixel signal readout section; and a control section controlling the signal readout operation of the pixel signal readout section and the voltage sampling operation of the voltage sampling section. The pixel signal readout section includes a functional portion operating when supplied with the internally or externally generated bias voltage. The control section exercises control such that the voltage sampling operation of the voltage sampling section is performed in a period other than at least either of a period in which an analog signal is read out and a period in which A/D conversion is carried out.

According to the embodiments of the invention, it is possible to prevent noise which can degrade image quality, e.g., circuit noise generated by a bias voltage generating circuit and external noise coming from outside a device from entering a column processing system without adding an external capacity.

DESCRIPTION OF PREFERRED EMBODIMENTS

Embodiments of the invention will now be described with reference to the drawings. The following items will be described in the order listed.

1. First Embodiment (First Exemplary Configuration of Solid-State Imaging Device)
2. Second Embodiment (Second Exemplary Configuration of Solid-State Imaging Device)
3. Third Embodiment (Exemplary Configuration of Camera System)

1. First Embodiment

Figure 1:
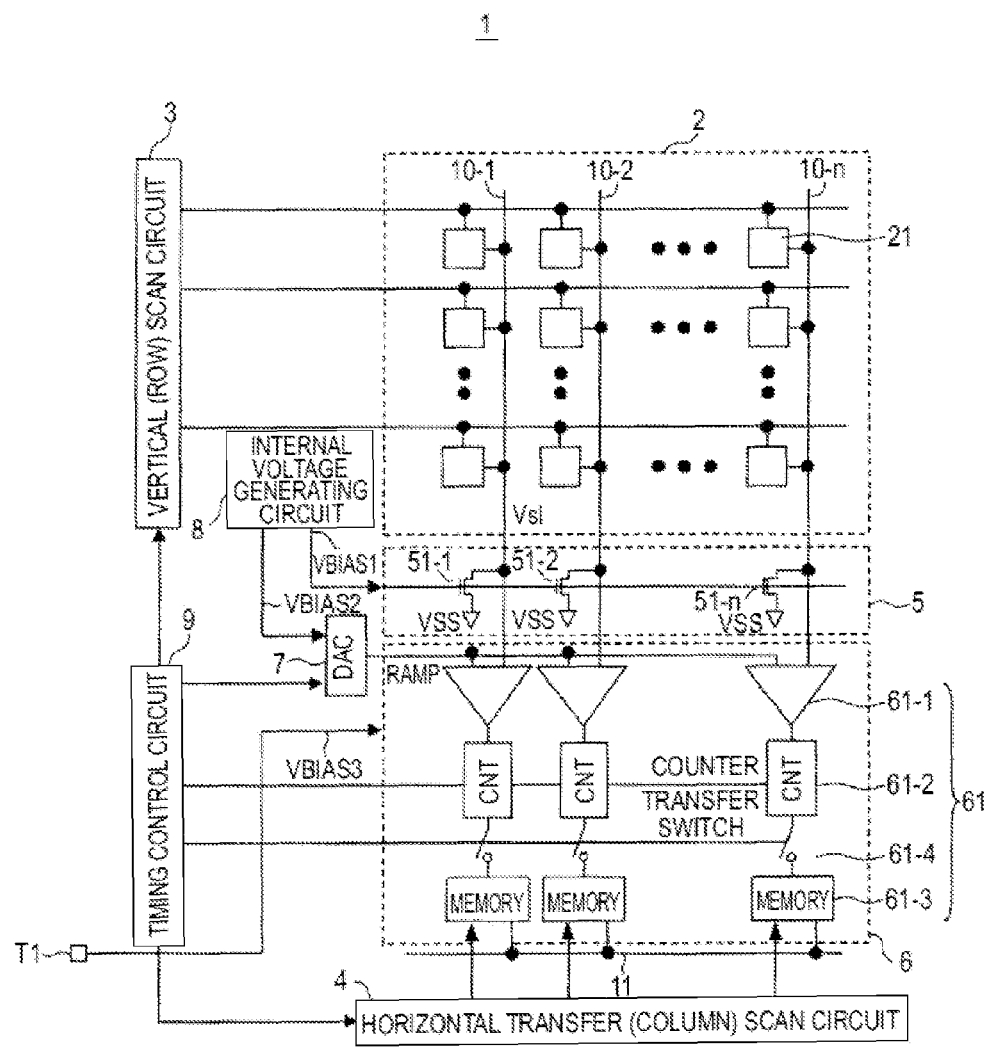
FIG. 1 is a block diagram showing an exemplary configuration of a solid-state imaging device (CMOS image sensor) having column-parallel ADCs incorporated therein.
Figure 2:
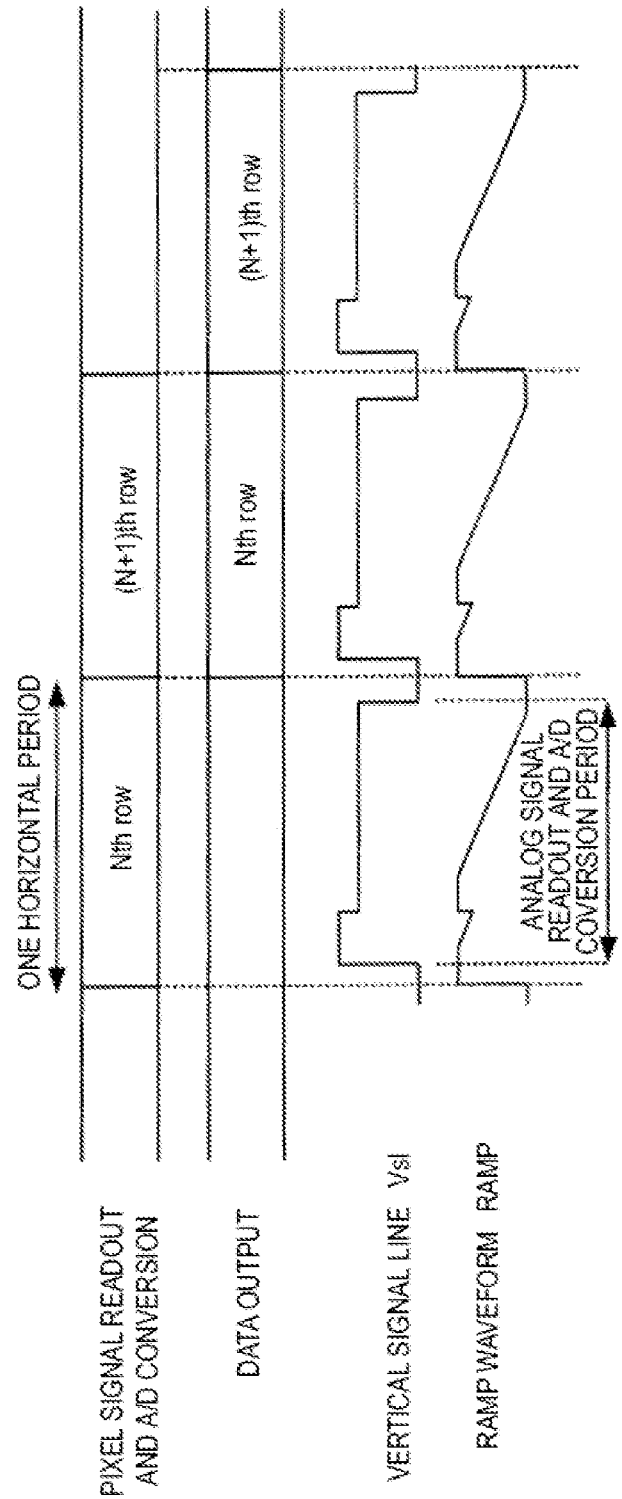
FIG. 2 is a timing chart of the circuits shown in FIG. 1.
Figure 3:
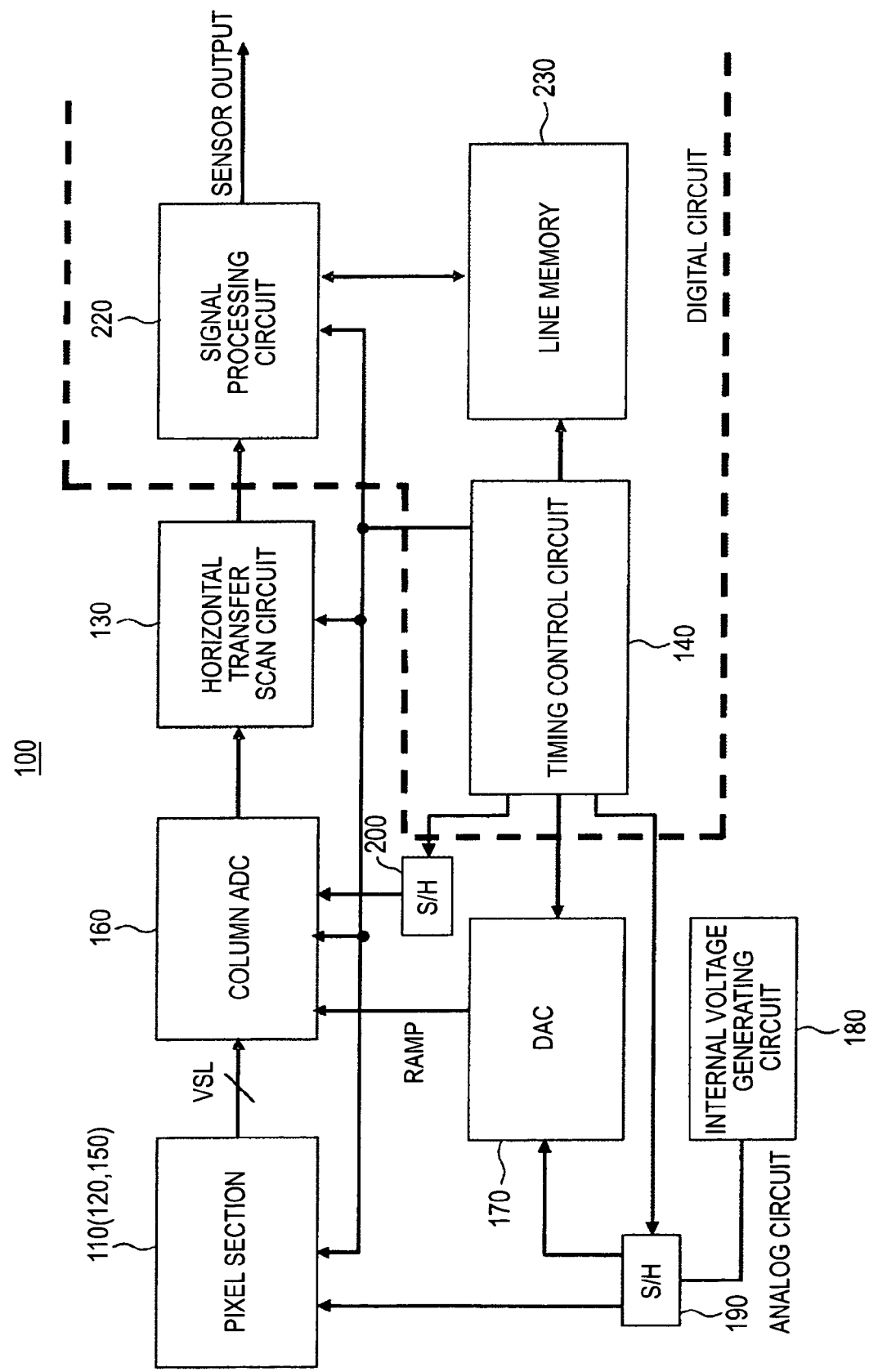
FIG. 3 is a block diagram showing an exemplary configuration of a solid-state imaging device (CMOS image sensor) having column-parallel ADCs incorporated therein according to an embodiment of the invention.

FIG. 3 is a block diagram showing an exemplary configuration of a solid-state imaging device (CMOS image sensor) having column-parallel ADCs incorporated therein according to an embodiment of the invention.

Figure 4:
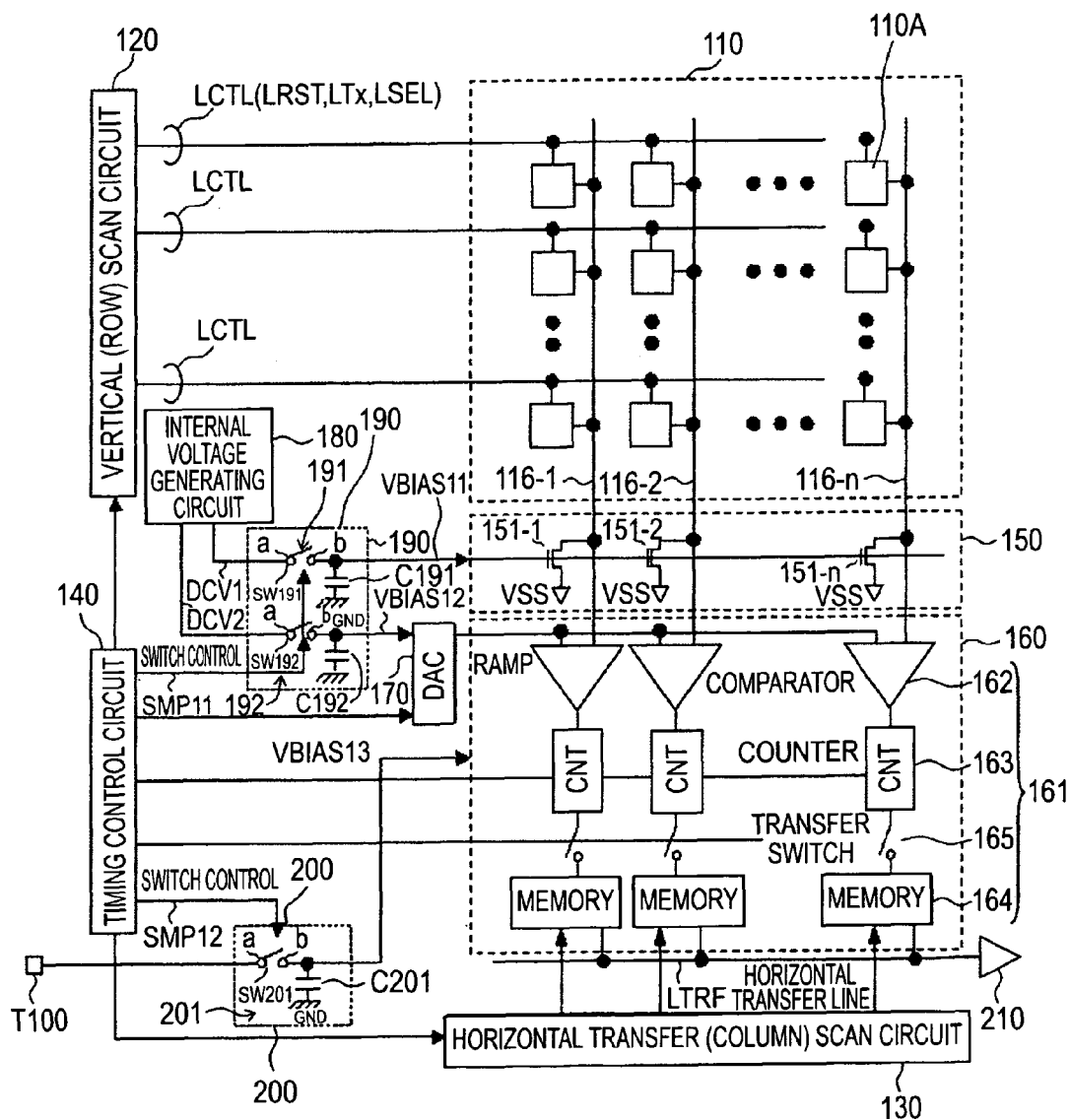
FIG. 4 is a block diagram which more specifically shows major parts of the solid-state imaging device (CMOS image sensor) having column-parallel ADCs incorporated therein according to the first embodiment shown in FIG. 3, the illustrated parts including a pixel section and a column circuit.

FIG. 4 is a block diagram which more specifically shows major parts of the solid-state imaging device (CMOS image sensor) having column-parallel ADCs incorporated therein according to the first embodiment shown in FIG. 3, the illustrated parts including a pixel section and a column circuit.

[Exemplary General Configuration of Solid-State Imaging Device]

As shown in FIGS. 3 and 4, a solid-state imaging device 100 includes a pixel section 110, vertical scan circuit (row scan circuit) 120, a horizontal transfer scan circuit (column scan circuit) 130, and a timing control circuit 140.

Further, the solid-state imaging device 100 includes a load circuit 150 serving as a column circuit, a column-parallel processing section 160 which is a group of ADCs, a DAC (digital-analog converter) 170, and an internal voltage generating circuit (bias circuit) 180.

The solid-state imaging device 100 also includes sample/hold circuits (S/H) 190 and 200, an amplifier circuit (S/A) 210, a signal processing circuit 220, and a line memory 230.

Among the constituent devices listed, the pixel section 110, the vertical scan circuit 120, the horizontal transfer scan circuit 130, the load circuit 150, the column-parallel processing section 160, the DAC 170, the internal voltage generating circuit 180, and the sample/hold circuits 190 and 200 are analog circuits.

The timing control circuit 140, the signal processing circuit 220, and the line memory 230 are digital circuits.

In the present embodiment, a pixel signal readout section is formed by the horizontal transfer scan circuit 130, the load circuit 150, the column-parallel processing section 160, and the DAC 170, and the timing control circuit 140 has functions corresponding to those of the control section described above.

In the present embodiment, the load circuit 150, the column-parallel processing section 160, and the DAC 170 include a functional portion to which an internally or externally generated bias voltage is supplied.

The pixel section 110 is formed by a plurality of unit pixels 110A in a two-dimensional arrangement having m rows and n columns (or in the form of a matrix), each unit pixel including a photodiode (photoelectric conversion device) and an in-pixel amplifier.

[Exemplary Configuration of Unit Pixel]

Figure 5:
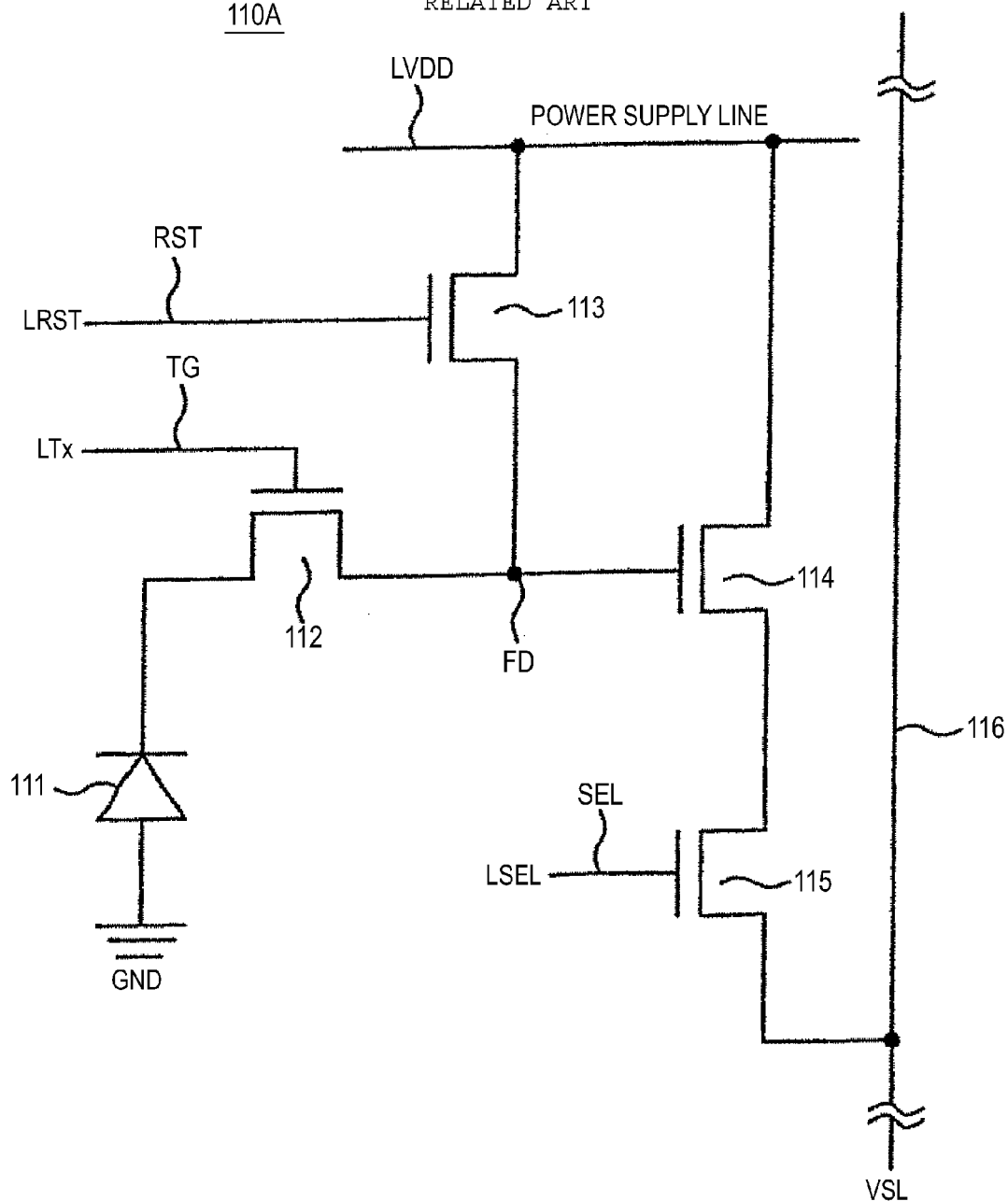
FIG. 5 is a diagram showing an example of a pixel of the CMOS image sensor according to the first embodiment, the pixel being formed by four transistors.

FIG. 5 is a diagram showing an example of a pixel of the CMOS image sensor according to the present embodiment, the pixel being formed by four transistors.

For example, a unit pixel 110A includes a photodiode 111 as a photoelectric conversion device.

The unit pixel 110A includes four transistors serving as active devices in association with one photodiode 111, i.e., a transfer transistor 112 serving as a transfer device, a reset transistor 113 serving as a reset device, an amplification transistor 114, and a selection transistor 115.

The photodiode 111 photo-electrically converts incident light into electrical charge (electrons in this case) in a quantity corresponding to the quantity of the incident light.

The transfer transistor 112 is connected between the photodiode 111 and floating diffusion FD serving as an output node.

When a drive signal TG is supplied to the gate (transfer gate) of the transfer transistor 112 through a transfer control line LTx, the transistor transfers electrons obtained by the photoelectric conversion at the photodiode 111 serving as a photoelectric conversion device to the floating diffusion FD.

The reset transistor 113 is connected between power supply line LVDD and the floating diffusion FD.

When a reset signal RST is supplied to the gate of the reset transistor 113 through a reset control line LRST, the transistor resets the potential at the floating diffusion FD to the potential at the power supply line LVDD.

The gate of the amplification transistor 114 is connected to the floating diffusion FD. The amplification transistor 114 is connected to a vertical signal line 116 through the selection transistor 115 to form a source follower in combination with a constant current source of the load circuit 150 outside the pixel section.

A control signal (an address signal or a select signal) SEL is supplied to the gate of the selection transistor 115 through a selection control line LSEL to turn the selection transistor 115 on.

When the selection transistor 115 is turned on, the amplification transistor 114 amplifies the electric potential at the floating diffusion FD and outputs a voltage in accordance with the electric potential to the vertical signal line 116. Such a voltage output from each pixel through the vertical signal line 116 is output to the column-parallel processing section 160 serving as a pixel signal readout circuit.

Those operations are performed at the pixels of each row simultaneously and in parallel with each other because the gates of the transfer transistors 112, the reset transistors 113, and the selection transistors 115 are connected to group the pixels on a row-by-row basis.

The reset control lines LRST, the transfer control lines LTx, and the selection control lines LSEL provided in the pixel section 110 are combined into sets of control lines LCTL, and the lines are laid such that one set of control lines serves each row of the pixel array.

The reset control lines LRST, the transfer control lines LTx, and the selection control lines LSEL are driven by the vertical scan circuit 120 serving as a pixel driving section.

The solid-state imaging device 100 includes control circuits for reading out signals from the pixel section 110 sequentially, i.e., the timing control circuit 140 generating an internal clock, the vertical scan circuit 120 controlling row addressing and row scanning, and the horizontal transfer scan circuit 130 controlling column addressing and column scanning.

The timing control circuit 140 generates timing signals required for signal processing at the pixel section 110, the vertical scan circuit 120, the horizontal transfer scan circuit 130, the column-parallel processing section 160, the DAC 170, the internal voltage generating circuit 180, the signal processing circuit 220, and the line memory 230.

The timing control circuit 140 controls turning on/off of sampling switches of the sample/hold circuits 190 and 200.

The timing control circuit 140 exercises control using sampling pulses such that the sampling switches of the sample/hold circuits 190 and 200 are turned on to sample bias voltages in a period within each horizontal period other than a period in which analog signals are readout and A/D-converted.

The timing control circuit 140 outputs a sampling pulse SMP11 to the sample/hold circuit 190 and outputs a sampling pulse SMP12 to the sample/hold circuit 200.

The timing control circuit 140 can control the timing and sample period at which the sample/hold circuits 190 and 200 sample bias voltages.

For example, the timing control circuit 140 includes a DAC control function portion which controls generation of a reference signal RAMP (Vslop) performed by the DAC 170 and the internal voltage generating circuit 180.

The DAC control function portion exercises control such that an offset of a reference signal RAMP is adjusted for each row on which A/D conversion is carried out by each column control circuit (ADC) 161 of the column-parallel processing section 160.

The DAC control function portion can exercise control to adjust an offset of a reference signal RAMP to be used for each of first-order sampling and second-order sampling when the column-parallel processing section 160 performs CDS (correlated double sampling).

The pixel section 110 photo-electrically converts pixels of an image or screen image on a row-by-row basis by accumulating and discharging photons utilizing a line shutter and outputs an analog signal VSL thus obtained to each column processing circuit 161 of the column-parallel processing section 160.

At the column-parallel processing section 160, each column section of the ADC block performs APGA-compatible integration type ADC on the analog output from the pixel section 110 using the reference signal (ramp signal) RAMP supplied from the DAC 170, and digital CDS is also performed on the analog output. Thus, a digital signal having a few bits is output.

The load circuit 150 serving as a column circuit includes load MOS transistors 151-1 to 151-$n$ which are associated with the columns of pixels and which are connected to vertical signal lines 116-1 to 116-$n$, respectively, at the drains thereof and which are connected to a reference potential VSS at the sources thereof.

The gates of the load MOS transistors 151-1 to 151-$n$ are commonly connected to a supply line of a bias voltage VBIAS11 which is generated by the internal voltage generating circuit 180 and sampled and held by the sample/hold circuit 190.

The load MOS transistors 151-1 to 151-$n$ function as current sources of source followers when pixels are read out.

The bias voltage VBIAS11 is supplied by the sample/hold circuit 190 when the analog signals VSL are being read out and A/D converted.

The load circuit 150 is electrically isolated from the internal voltage generating circuit 180, which is a source of noise, by the sample/hold circuit 190 while the analog signals VSL are being read out and A/D converted.

Since the load circuit 150 is electrically isolated from the internal voltage generating circuit 180, which is a source of noise, by the sample/hold circuit 200 while the analog signals are being read out and A/D converted as thus described, noise is prevented from entering the load circuit and the ADCs.

[Exemplary Configuration of Column ADC]

The column-parallel processing section 160 of the present embodiment is formed by a plurality of column processing circuits (ADCs) 161 which are ADC blocks.

Specifically, the column-parallel processing section 160 is formed by column-parallel ADC blocks which have a k-bit digital signal converting function and which are disposed in association with respective vertical signal lines (column lines) 116-1 to 116-$n$.

Each of ADCs 161 includes a comparator 162 as a functional portion for comparing a reference signal RAMP (Vslop) which is a ramp waveform obtained by varying a reference signal generated by the DAC 170 stepwise with an analog signal VSL which is obtained from the respective pixel on each row line through the vertical signal line.

Further, each of the ADC includes a counter 163 counting a comparison time and a memory (latch) 164 holding the result of the counting carried out by the counter 163. The ADC 161 also includes a transfer switch 165.

The output of each memory 164 is connected to a horizontal transfer line LTRF having a width of, for example, k bits.

In association with the horizontal transfer line LTRF, k amplifier circuits 210 and a signal processing circuit 220 are provided.

The comparator 162 includes differential pair transistors, and a bias voltage VBIAS13 input through an external bias input terminal T11 and sampled and held by the sample/hold circuit 200 is supplied to the gate of a transistor serving as a current source of the differential pair of the comparator 162.

Thus, the bias voltage VBIAS13 is supplied by the sample/hold circuit 200 while the analog signal VSL is being read out.

The comparator 162 is electrically isolated by the sample/hold circuit 200 from the external line which is a source of noise while the analog signal is read out and A/D converted.

Figure 6:
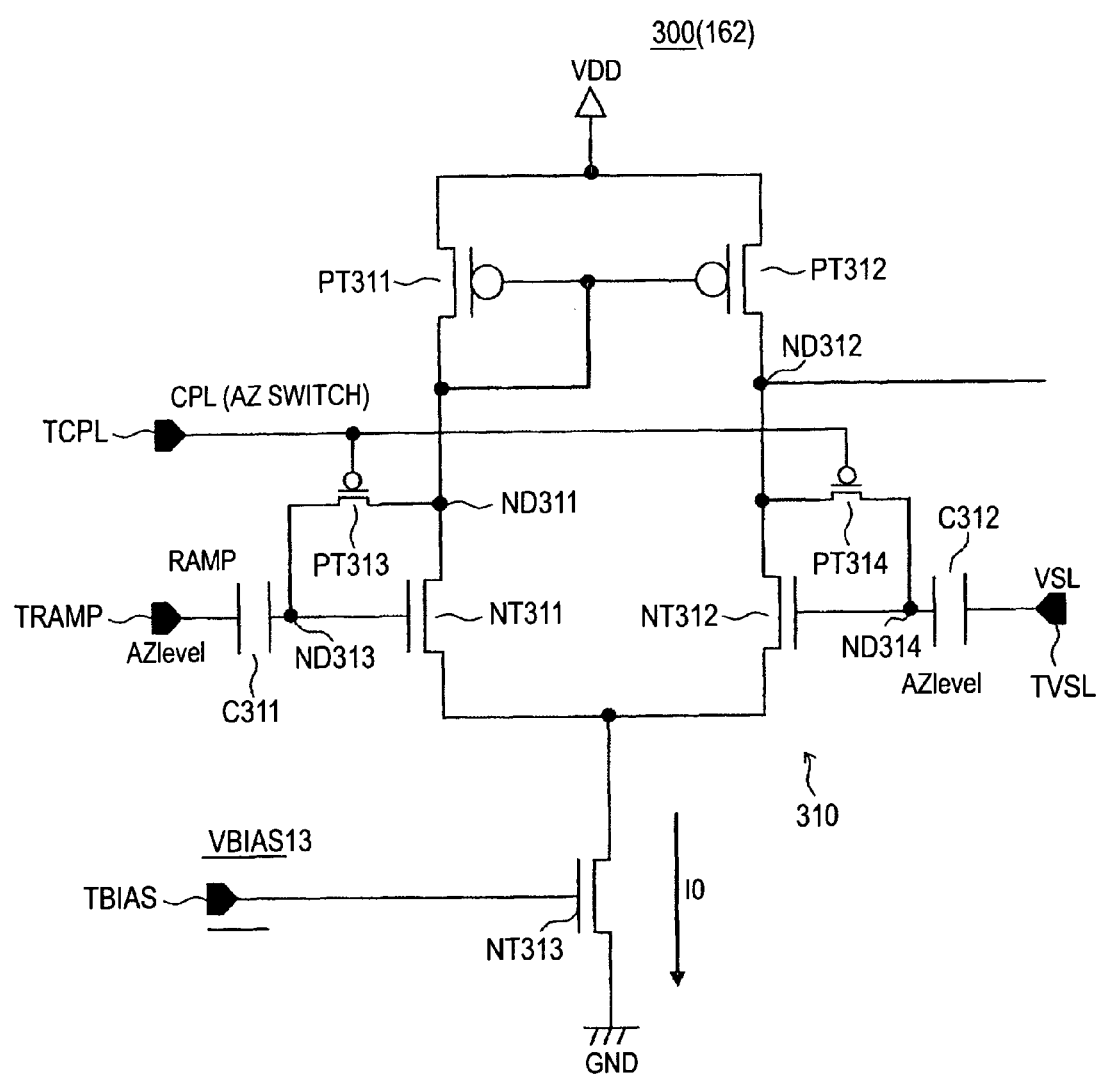
FIG. 6 is a circuit diagram showing an exemplary configuration of a comparator according to the first embodiment.

FIG. 6 is a circuit diagram showing an exemplary configuration of a comparator according to the present embodiment.

The comparator is represented by reference numeral 300.

As shown in FIG. 6, the comparator 300 includes an amplifier 310 having the function of performing low rate signal comparison at the initial stage to narrow the operating bandwidth.

The amplifier 310 includes p-channel MOS (PMOS) transistors PT311 to PT314 and n-channel MOS (NMOS) transistors NT311 to NT313. The amplifier 310 also includes first capacitors C311 and C312 which are sampling capacities having the auto zero level capability.

The source of the PMOS transistor PT311 and the source of the PMOS transistor PT312 are connected to a power supply potential VDD.

The drain of the PMOS transistor PT311 is connected to the drain of the NMOS transistor NT311, and the connection point constitutes a node ND311. The drain and gate of the PMOS transistor PT311 are connected, and the connection point is connected to the gate of the PMOS transistor PT312.

The drain of the PMOS transistor PT312 is connected to the drain of the NMOS transistor NT312, and the connection point constitutes an output node ND312 of the amplifier 310.

The emitters of the NMOS transistor NT311 and the NMOS transistor NT312 are connected to each other, and the connection point is connected to the drain of the NMOS transistor NT313. The source of the NMOS transistor NT313 is connected to a ground potential GND.

The gate of the NMOS transistor NT311 is connected to a first electrode of the capacitor C311, and the connection point constitutes a node ND313. A second electrode of the capacitor C311 is connected to an input terminal TRAMP for the ramp signal RAMP.

The gate of the NMOS transistor NT312 is connected to a first electrode of the capacitor C312, and the connection point constitutes a node ND314. A second electrode of the capacitor C312 is connected to an input terminal TVSL for the analog signal VSL.

The gate of the NMOS transistor NT313 serving as the current source of the differential pair transistors is connected to an input terminal TBIAS for the bias signal VBIAS13.

The source of the PMOS transistor PT313 is connected to the node ND311, and the drain of the transistor is connected to the node ND313. The source of the PMOS transistor PT314 is connected to the node ND312, and the drain of the transistor is connected to the node ND314.

The gates of the PMOS transistors PT313 and PT314 are commonly connected to an input terminal TCPL for a first control pulse signal CPL which is active at a low level.

In the amplifier 310 having such a configuration, a current mirror circuit is formed by the PMOS transistors PT311 and PT312.

Further, the NMOS transistors NT311 and NT312 form a differential comparing portion whose current source is the NMOS transistor NT313.

The gate of the NMOS transistor NT311 constitutes a first signal input terminal, and the gate of the NMOS transistor NT312 constitutes a second signal input terminal.

The PMOS transistors PT313 and PT314 function as auto-zero switches, and the capacitors C311 and C312 function as sampling capacities having the auto zero level capability.

An output signal of the amplifier 310 is output from the output node ND312.

As thus described, in the comparator 300, the bias signal VBIAS13 is supplied to the gate of the NMOS transistor NT313 serving as a current source.

Since the comparator 300 is electrically isolated from the external line that is a source of noise by the sample/hold circuit 200 while an analog signal is being read out and A/D converted, external noise is prevented from entering the ADC.

In the column-parallel processing section 160 having such comparators, the analog signal potential VSL read out to the vertical signal lines 116 is compared with the reference signal RAMP by the comparator 162 provided in each column.

At this time, the counter 163 disposed in each column like the comparator 162 is in operation.

At each ADC 161, the value of the reference signal RAMP (potential Vslop) having a ramp waveform and the counter value change in one-to-one correspondence with each other, whereby the potential (analog signal) VSL on the vertical signal line 116 is converted into a digital signal.

The ADC 161 converts a change in the voltage of the reference signal RAMP (potential Vslop) into a temporal change (time interval), and the time interval is counted using a certain period (clock) to convert it into a digital value.

When the levels of the analog signal VSL and the reference signal RAMP (Vslop) cross each other, the output of the comparator 162 is inverted to stop the clock input to the counter 163 or to resume the input of the clock to the counter 163, whereby A/D conversion is completed. The data obtained by the A/D conversion is held in the memories 164.

When the above-described A/D conversion period ends, the data held in the memories 164 is transferred to the horizontal transfer line LTRF by the horizontal transfer scan circuit 130. The data is input through the amplifier circuit 210 to the signal processing circuit 220 at which predetermined signal processing is performed on the data to generate a two-dimensional image.

The horizontal transfer scan circuit 130 transfers data on a multi-channel simultaneous parallel transfer basis in order to maintain a certain transfer rate.

The timing control circuit 140 generates timing required for signal processing at each of blocks such as the pixel section 110 and column-parallel processing section 160.

In the signal processing section 220 provided downstream of the timing control circuit, correction of vertical line defects and point defects and a signal clamping process is carried out using signals stored in the line memory 230. Digital signal processing is also performed, including serial-parallel conversion, compression, coding, summation, averaging, and intermittent operations.

Digital signals transmitted from each row of pixels are stored in the line memory 230.

In the solid-state imaging device 100 of the present embodiment, digital output from the signal processing circuit 220 is transmitted as input to an ISP or baseband LSI.

The DAC 170 generates a reference signal RAMP (ramp signal) which is a sloped waveform changing linearly with a certain slope under control exercised by a DAC control function portion of the timing control circuit 140, and the DAC outputs the reference signal RAMP to the column-parallel processing section 160.

For example, the DAC 170 generates an offset-adjusted reference signal RAMP for each row of pixels to be subjected to A/D conversion by each column process circuit (ADC) 161 of the column-parallel processing section 160, under control exercised by the DAC control function portion.

DAC 170 generates an offset-adjusted reference signal RAMP at each of sampling processes, i.e., first-order sampling and second-order sampling, involved in the correlated double sampling performed at the column-parallel processing section 160, under control exercised by the DAC control function portion.

The DAC 170 is a current-controlled DAC, and the bias voltage VBIAS12 sampled and held by the sample/hold circuit 190 is supplied to a current source (e.g., the gate of a transistor) for current control.

As thus described, the bias voltage VBIAS12 is supplied by the sample/hold circuit 190 during a period in which the analog signals VSL are read out and A-D converted.

The DAC 170 is electrically isolated by the sample/hold circuit 190 from the internal voltage generating circuit 180 which is a source of noise while the analog signals are being read out and A-D converted. Thus, noise is prevented from entering the DAC and the ADCs.

Figure 7:
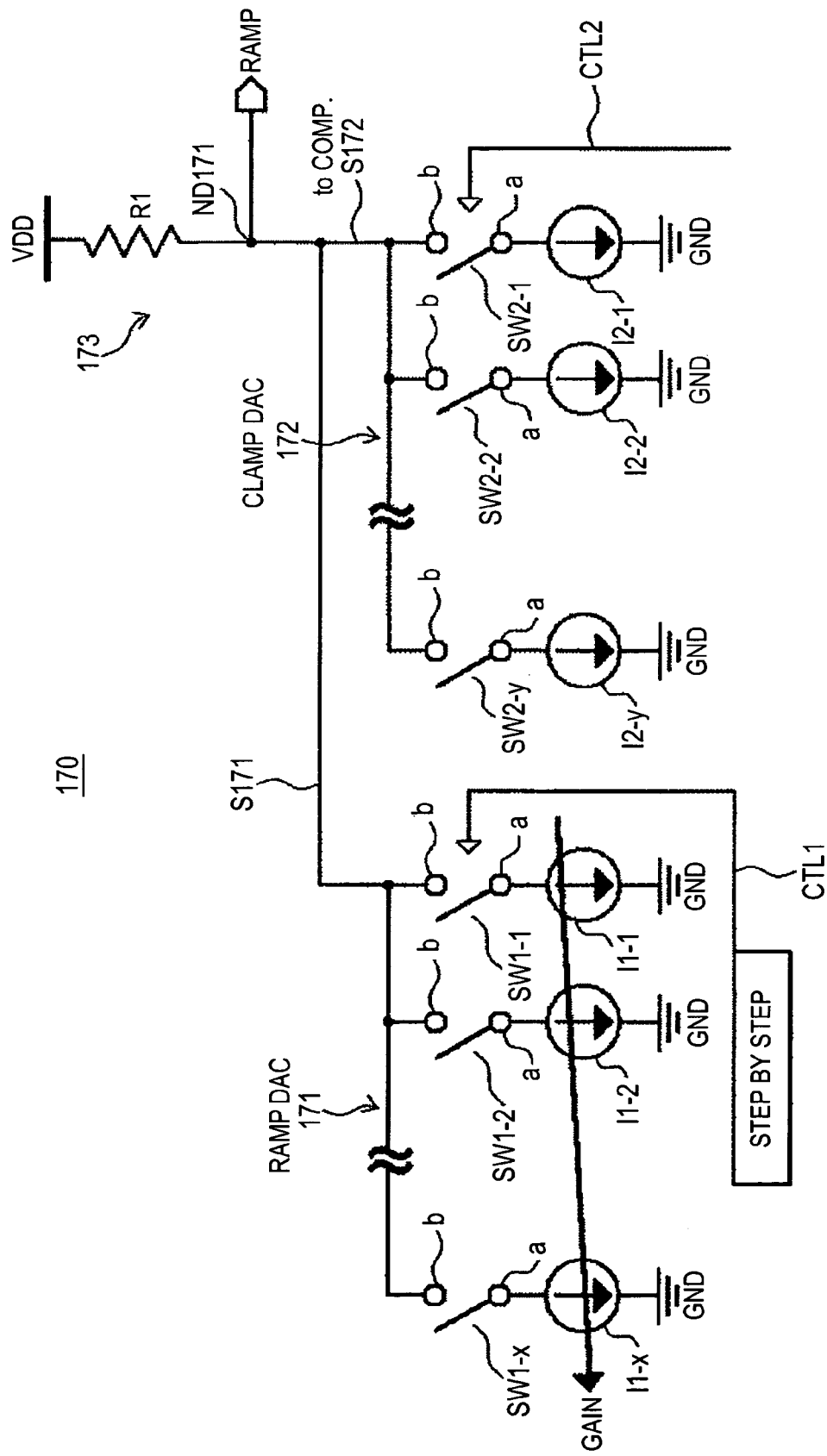
FIG. 7 is a diagram showing an example of a basic configuration of the current-controlled DAC according to the first embodiment.

As shown in FIG. 7, the DAC 170 includes a ramp DAC (slope DAC) 171, a clamp DAC 172, and a summing portion 173.

FIG. 7 is a diagram showing an example of a basic configuration of the current-controlled DAC according to the present embodiment.

The current-controlled DAC 170 is configured as a power base type DAC which operates based on a power supply VDD. The DAC may alternatively be configured as a ground base type DAC which operates based on ground GND.

Specifically, one end of a reference resistor R1 is connected to the power supply VDD. The output of the ramp DAC 171 and the output of the clamp DAC 172 are connected to another end of the reference resistor R1, and the connection point constitutes a ramp output node ND171.

The summing portion 173 is formed by the reference resistor R1 and the ramp output node ND171.

The ramp DAC 171 includes x current sources I1-1 to I1-$x$ and x switches SW1-1 to SW1-$x$.

Reference potentials VSS, e.g., the current sources I1-1 to I1-$x$, which are connected to the ground GND, are connected to terminals a of the switches SW1-1 to SW1-$x$, respectively.

Terminals b of the switches SW1-1 to SW1-$x$ are commonly connected to an output node ND161.

The switches SW1-1 to SW1-$x$ are selectively turned on/off according to a control signal CTL1 supplied from the DAC control function portion.

The ramp DAC 171 is supplied with the bias voltage VBIAS12 sampled and held by the sample/hold circuit 190 at the current sources I1-1 to I1-$x$ for current control.

As thus described, the bias voltage VBIAS12 is supplied by the sample/hold circuit 190 during a period in which the analog signals VSL are read out and A-D converted.

In this way, the ramp DAC 171 is electrically isolated by the sample/hold circuit 190 from the internal voltage generating circuit 180 which is a source of noise while the analog signals are being read out and A/D converted, and noise is prevented from entering the DAC and the ADCs.

The clamp DAC 172 includes y current sources I2-1 to I2-$y$ and y switches SW2-1 to SW2-$y$.

The current sources I2-1 to I2-$y$, which are connected to the ground GND, are connected to terminals a of the switches SW2-1 to SW2-$y$, respectively.

Terminals b of the switches SW2-1 to SW2-$y$ are commonly connected to the output node ND161.

The switches SW2-1 to SW2-$y$ are selectively turned on/off according to a control signal CTL2 supplied from a DAC control portion 141.

In the DAC 170, a reference signal RAMP (ramp wave) based on integration type ADC is generated by summing an output signal S172 from the DAC 172 for controlling DC level and an output signal S171 from the ramp DAC 171, as shown in FIG. 7.

[Exemplary Configuration of Sample/Hold Circuit]

The sample/hold circuit 190 includes two sample/hold portions 191 and 192.

The sample/hold portion 191 samples and holds a DC bias voltage VDC11 generated by the internal voltage generating circuit 180 for a period in which a sampling pulse SMP11 as a control signal is supplied to the same in an active state (e.g., at a high level).

The sample/hold portion 191 samples and holds a bias voltage output from the internal voltage generating circuit 180 (in a horizontal period) except a period during which the analog signals are read out and A/D converted.

The sample/hold portion 191 supplies the DC bias voltage VDC11 thus held to the gates of the load MOS transistors 151-1 to 151-$n$ of the load circuit 150 commonly as a bias voltage VBIAS11.

As thus described, the sample/hold portion 191 samples and holds a bias voltage output from the internal voltage generating circuit 180 except a period during which the analog signals are read out and A/D converted. The sample/hold portion 191 electrically isolates the load circuit (column circuit) and ADCs from the internal voltage generating circuit 180 which is a source of noise during the period in which the analog signals are being read out and A/D converted. Thus, a path of noise is interrupted.

The sample/hold portion 191 includes a sampling switch SW191 and a holding capacitor C191.

A terminal a of the sampling switch SW191 is connected to a line for supplying the DC bias voltage VDC11 from the internal voltage generating circuit 180. Another terminal b of the switch is connected to one end of the capacitor C191, and the connection point is connected to a line for supplying the bias voltage VBIAS11.

Another end of the capacitor C191 is connected to the reference potential VSS.

The sampling switch SW191 is on during the period in which the sampling pulse SMP11 from the timing control circuit 140 is supplied in an active state (e.g., at the high level).

The sampling pulse SMP11 is supplied such that the sampling switch SW191 of the sample/hold portion 191 stays on to allow a bias voltage to be sampled and held in a period within each horizontal period other than the period in which the analog signals are read out and A/D converted.

The sample/hold portion 192 samples and holds a DC bias voltage VDC12 generated by the internal voltage generating circuit 180 for a period in which the sampling pulse SMP11 as a control signal is supplied to the same in an active state (e.g., at the high level).

The sample/hold portion 192 samples and holds the DC bias voltage VDC12 output from the internal voltage generating circuit for a period within each horizontal period other than the period in which the analog signals are read out and A/D converted.

The sample/hold portion 192 commonly supplies the DC bias voltage VDC12 thus held to the DAC 170 as a bias voltage VBIAS12.

As thus described, the sample/hold portion 192 samples and holds the bias voltage VDC2 output from the internal voltage generating circuit 180 except a period in which the analog signals are read out and A/D converted.

The sample/hold portion 192 electrically isolates the DAC and ADCs from the internal voltage generating circuit 180 which is a source of noise during the period in which the analog signals are read out and A/D converted. Thus, a path of noise is interrupted.

The sample/hold portion 192 includes a sampling switch SW192 and a holding capacitor C192.

A terminal a of the sampling switch SW192 is connected to a line for supplying the DC bias voltage VDC12 from the internal voltage generating circuit 180. Another terminal b of the switch is connected to one end of the capacitor C192, and the connection point is connected to a line for supplying the bias voltage VBIAS12.

Another end of the capacitor C192 is connected to the reference potential VSS.

The sampling switch SW192 is on during the period in which the sampling pulse SMP11 from the timing control circuit 140 is supplied in an active state (e.g., at the high level).

The sampling pulse SMP11 is supplied such that the sampling switch SW192 of the sample/hold portion 192 stays on to allow a bias voltage to be sampled and held in a period within each horizontal period other than the period in which the analog signals are read out and A/D converted.

In the present embodiment, the sampling switches SW191 and SW192 of the two sample/hold portions 191 and 192 of the sample/hold circuit 190 are turned on/off under the control of the same sampling pulse SMP11.

Alternatively, the turning on/off of the sampling switches SW191 and SW192 of the two sample/hold portions 191 and 192 may be controlled independently of each other using different sampling pulses.

The sample/hold circuit 200 includes one sample/hold portion 201.

The sample/hold portion 201 samples and holds a DC bias voltage VDC13 input through an external bias input terminal T100 during a period in which a sampling pulse SMP12 as a control signal is supplied in an active state (e.g., at the high level).

The sample/hold portion 201 samples and holds the DC bias voltage VDC13 output through the internal voltage generating circuit in a period within each horizontal period other than a period in which the analog signals are read out and A/D converted.

The sample/hold portion 201 supplies the DC bias voltage VDC13 thus held to the gates of the NMOS transistors 313 constituting current sources of the comparators 162 of the column-parallel processing section 160 as a bias voltage VBIAS 13 commonly.

As thus described, the sample/hold portion 201 samples and holds the bias voltage input from the outside except the period in which the analog signals are read out and A/D converted. Thus, the sample/hold portion 201 electrically isolates the ADCs from an external line which is a source of noise during the period in which the analog signals are read out and A/D converted, whereby a path of noise is interrupted.

The sample/hold portion 201 includes a sampling switch SW201 and a holding capacitor C201.

A terminal a of the sampling switch SW201 is connected to the input terminal T100. Another terminal b of the switch is connected to one end of the capacitor C201, and the connection point is connected to a line for supplying the bias voltage VBIAS13.

Another end of the capacitor C201 is connected to the reference potential VSS.

The sampling switch SW201 is on during a period in which the sampling pulse SMP12 from the timing control circuit 140 is supplied in an active state (e.g., at the high level).

The sampling pulse SMP12 is supplied such that the sampling switch SW201 of the sample/hold portion 201 stays on to allow a bias voltage to be sampled and held in a period within each horizontal period other than the period in which the analog signals are read out and A/D converted.

The internal voltage generating circuit 180 generates the DC bias voltages VDC11 and VDC12, supplies the DC bias voltage VDC11 to the sample/hold portion 191 and supplies the DC bias voltage VDC12 to the sample/hold portion 192.

[Exemplary Operations of Solid-State Imaging Device]

Figure 8:
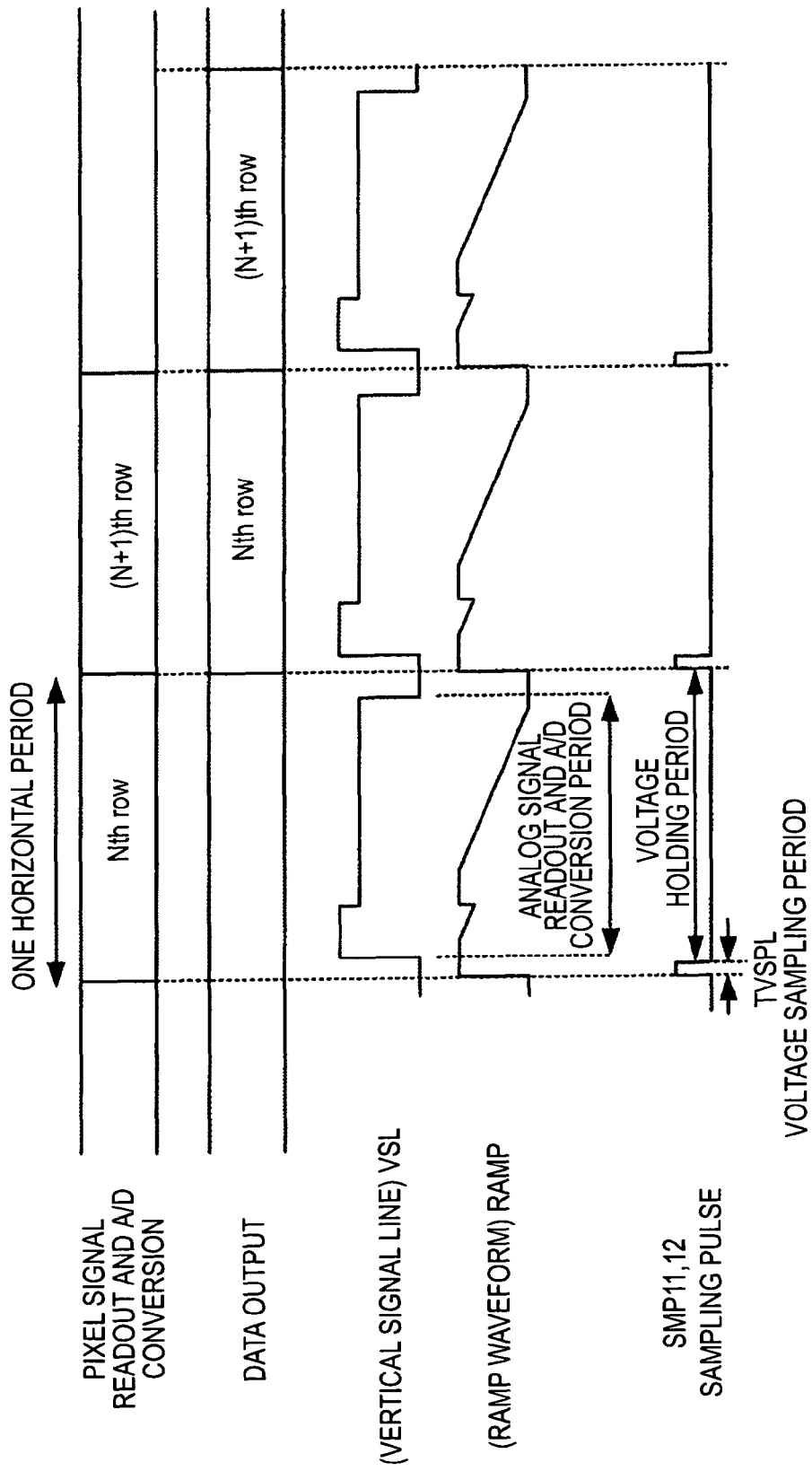
FIG. 8 is a timing chart for explaining operations of the solid-state imaging device of the first embodiment.

FIG. 8 is a timing chart for explaining operations of the solid-state imaging device of the first embodiment.

Operations of the device having the above-described configuration will now be described with reference to FIG. 8.

The sample/hold circuits 190 and 200 receive the sampling pulses SMP11 and SMP12 from the timing control circuit 140 in a period within each horizontal period other than the period in which analog signals are read out and A/D converted.

In this example, a predetermined period since the beginning of the horizontal period constitutes a voltage sampling period TVSPL in which the sampling pulses SMP11 and SMP12 are supplied from the timing control circuit 140 in an active state or at the high level.

At the sample/hold circuit 190, the sampling switches SW191 and SW192 are on during the period in which the sampling pulse SMP11 is at the high level.

As a result, the DC bias voltages VDC11 and VDC12 supplied from the internal voltage generating circuit 180 are sampled in the sample/hold circuit 190 and held in the capacitors C191 and C192 which are internal capacities of the sample/hold circuit 190.

Thereafter, the sampling pulse SMP11 is switched to the low level to turn off the sampling switches SW191 and SW192.

Thus, the DC bias voltages VDC11 and VDC12 are held in the capacitors C191 and C192 which are internal capacities of the sample/hold circuit 190.

At the sample/hold circuit 200, the sampling switch SW201 is on during the period in which the sampling pulse SMP12 is at the high level.

As a result, the DC bias voltage VDC13 supplied through the external bias input terminal T100 is sampled in the sample/hold circuit 200 and held in the capacitor C201 which is an internal capacity of the sample/hold circuit 200.

Thereafter, the sampling pulse SMP12 is switched to the low level to turn off the sampling switch SW201.

Thus, the DC bias voltage VDC13 is held in the capacitor C201 which is an internal capacity of the sample/hold circuit 200.

During the period in which the analog signals are read out and A/D converted, the voltages held in the capacitors C191 and C192, which are internal capacities of the sample/hold circuit 190, are supplied to the load circuit 150 and the DAC 170 as the bias voltages VBIAS11 and VBIAS12.

The voltage held in the capacitor C201 which is the internal capacity of the sample/hold circuit 200 is supplied to the comparators 162 of the column-parallel processing section 160 as the bias voltage VBIAS13 during the period in which the analog signals are read out and A/D converted.

The bias voltages VBIAS11, VBIAS12, and VBIAS13 are electrically isolated from the voltage generating circuit and the external bias input terminal which can be sources of noise by the sampling switches SW191 and SW192 of the sample/hold circuit 190 and the sampling switch SW201 of the sample/hold circuit 200.

Thus, the voltages are supplied to the load circuit 150, the DAC 170, and the column-parallel processing section 160 including ADCs as DC bias voltages including no temporal noise at all. It is therefore possible to suppress degradation of image quality attributable to propagation of noise during an A/D conversion period.

The period at which the DC bias voltages are sampled and held as described above can be varied under the control of the timing control circuit 140, and the period is not limited to one horizontal period as shown in FIG. 8.

At the DAC 170, for example, the output signal S172 of the clamp DAC 172 for DC level control and the output signal S171 of the ramp DAC 171 are summed to generate an offset-adjusted reference signal RAMP (Vslop) in the P-phase.

At each of the column processing circuits (ADCs) 161, the analog signal potential VSL read out to the vertical signal line 116 is compared with the reference signal RAMP at the comparator 162 disposed in the column.

The counter 163 keeps counting until the levels of the analog potential VSL and the reference signal RAMP cross each other to invert the output of the comparator 162.

For example, the counting operation of the counter 163 is in synchronism with a clock CLK. The counting operation is stopped when the output level of the comparator 162 is inverted, and the counter value at that time is held in the memory 164.

Such a reset level (in the P-phase) at each pixel has some variation.

The second A/D conversion takes place when a signal obtained at each unit pixel 110A through photoelectric conversion is readout to the vertical signal lines 116 (116-1 to 116-$n$) (D-phase) and AD converted.

At the DAC 170, the output signal S172 of the clamp DAC 172 for DC level control and the output signal S171 of the ramp DAC 171 are summed to generate an offset-adjusted reference signal RAMP (Vslop) also in the D-phase.

At each of the column processing circuits (ADCs) 161, the analog signal potential VSL read out to the vertical signal line 116 is compared with the reference signal RAMP at the comparator 162 disposed in the column.

The counter 163 keeps counting until the levels of the analog potential VSL and the reference signal RAMP cross each other to invert the output of the comparator 162.

For example, the counting operation of the counter 163 is in synchronism with the clock CLK. The counting operation is stopped when the output level of the comparator 162 is inverted, and the counter value at that time is held in the memory 164.

The results of conversion in the P- and D-phases are combined, and levels in the P-phase are subtracted from levels in the D-phase. Thus, correlated double sampling (CDS) can be carried out.

Digital signals obtained by the conversion described above are sequentially read out by the horizontal (column) transfer scan circuit 130 and supplied to the amplifier circuit 210 through the horizontal transfer line LTRF, and the signals are finally output from the amplifier circuit.

A column-parallel output process is carried out as thus described.

As described above, in the solid-state imaging device of the present embodiment, noise degrading image quality, e.g., circuit noise generated by a bias voltage generating circuit or external noise coming from outside the device, can be prevented from entering a column processing system without adding no external capacity.

2. Second Embodiment

Figure 9:
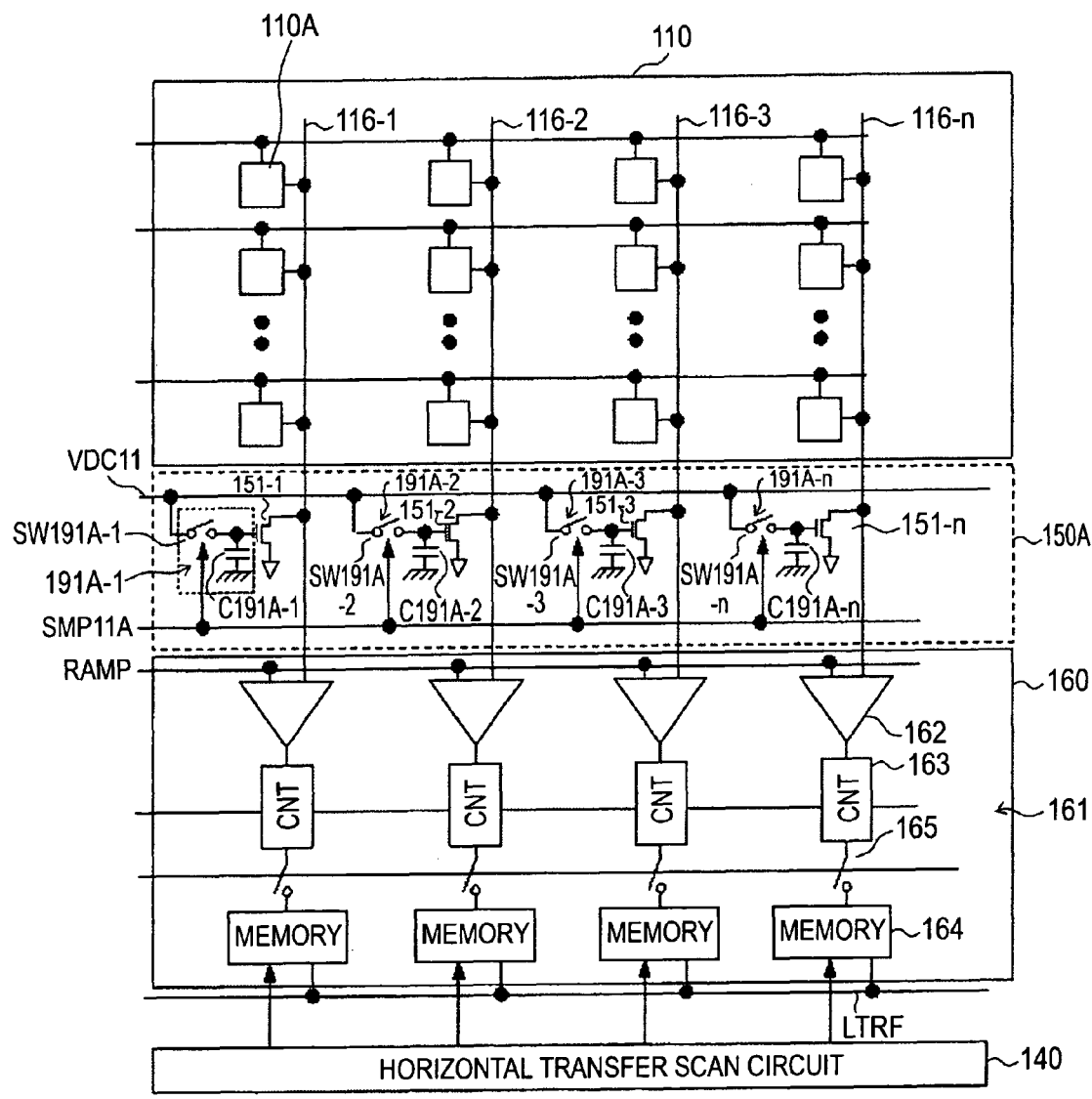
FIG. 9 is a block diagram of a solid-state imaging device (CMOS image sensor) having column-parallel ADCs according to a second embodiment of the invention, the diagram showing major parts of the device including a pixel section and a column circuit.

FIG. 9 is a block diagram of a solid-state imaging device (CMOS image sensor) 100A having column-parallel ADCs in FIG. 3 according to a second embodiment of the invention, the diagram showing major parts of the device including a pixel section and a column circuit.

The solid-state imaging device 100A according to the second embodiment is different from the solid-state imaging device 100 according to the first embodiment in the following points.

In the solid-state imaging device 100 according to the first embodiment, the sample/hold portion 191 of the sample/hold circuit 190 is provided to supply a common bias voltage to the load circuit 150.

On the contrary, the solid-state imaging device 100A according to the second embodiment includes individual sample/hold portions 191A-1 to 191A-$n$ provided in one-to-one association with load MOS transistors 151-1 to 151-$n$ of a load circuit 150A.

The sample/hold portion 191A-1 includes a sampling switch SW191A-1 and a holding capacitor C191A-1.

A terminal a of the sampling switch SW191A-1 is connected to a line for supplying a DC bias voltage VDC11 from an internal voltage generating circuit 180.

A terminal b of the sampling switch SW191A-1 is connected to one end of the capacitor 191A-1, and the connection point is connected to the gate of the load MOS transistor 151-1 to supply a bias voltage VBIAS11 to the transistor.

Another end of the capacitor C191A-1 is connected to a reference potential VSS.

The sampling switch SW191A-1 is on during a period in which a sampling pulse SMP11A in an active state (e.g., at a high level) is supplied from a timing control circuit 140.

The sample/hold portion 191A-2 includes a sampling switch SW191A-2 and a holding capacitor C191A-2.

A terminal a of the sampling switch SW191A-2 is connected to the line for supplying the DC bias voltage VDC11 from the internal voltage generating circuit 180.

A terminal b of the sampling switch SW191A-2 is connected to one end of the capacitor 191A-2, and the connection point is connected to the gate of the load MOS transistor 151-2 to supply the bias voltage VBIAS11 to the transistor.

Another end of the capacitor C191A-2 is connected to the reference potential VSS.

The sampling switch SW191A-2 is on during the period in which the sampling pulse SMP11A in an active state (e.g., at a high level) is supplied from the timing control circuit 140.

The sample/hold portion 191A-3 includes a sampling switch SW191A-3 and a holding capacitor C191A-3.

A terminal a of the sampling switch SW191A-3 is connected to a line for supplying the DC bias voltage VDC11 from the internal voltage generating circuit 180.

A terminal b of the sampling switch SW191A-3 is connected to one end of the capacitor C191A-3, and the connection point is connected to the gate of the load MOS transistor 151-3 to supply the bias voltage VBIAS11 to the transistor.

Another end of the capacitor C191A-3 is connected to the reference potential VSS.

The sampling switch SW191A-3 is on during a period in which the sampling pulse SMP11A in an active state (e.g., at the high level) is supplied from the timing control circuit 140.

Similarly, the sample/hold portion 191A-$n$ includes a sampling switch SW191A-$n$ and a holding capacitor C191A-$n$.

A terminal a of the sampling switch SW191A-$n$ is connected to a line for supplying the DC bias voltage VDC11 from the internal voltage generating circuit 180.

A terminal b of the sampling switch SW191A-$n$ is connected to one end of the capacitor C191A-$n$, and the connection point is connected to the gate of the load MOS transistor 151-$n$ to supply the bias voltage VBIAS11 to the transistor.

Another end of the capacitor C191A-$n$ is connected to the reference potential VSS.

The sampling switch SW191A-$n$ is on during a period in which the sampling pulse SMP11A in an active state (e.g., at the high level) is supplied from the timing control circuit 140.

The sampling pulse SMP11A is supplied such that the sampling switches SW191A-1 to SW191A-$n$ stay on to sample and hold a bias voltage during each horizontal period except a period in which analog signals are read out and A/D converted.

In the second embodiment of the invention, the sample/hold portions 191A-1 to 191A-n provided in the respective column circuits of the load circuit sample and hold the DC bias voltage supplied to the respective column circuits in a period other than the period in which analog signals are read out and A/D converted.

As thus described, the present embodiment of the invention may be applied to any circuit configuration in which a device is supplied with a bias voltage from a voltage generation circuit and supplied from outside the device.

A sample/hold portion for interrupting noise may be disposed either inside or outside a load circuit.

The second embodiment provides the same advantage as that of the above-described first embodiment.

Specifically, according to the second embodiment, noise which can degrade image quality can be prevented from entering a column processing system of a device, such noise including circuit noise generated by a bias voltage generating circuit and external noise entering the device from outside without adding an external capacitor.

Figure 10:
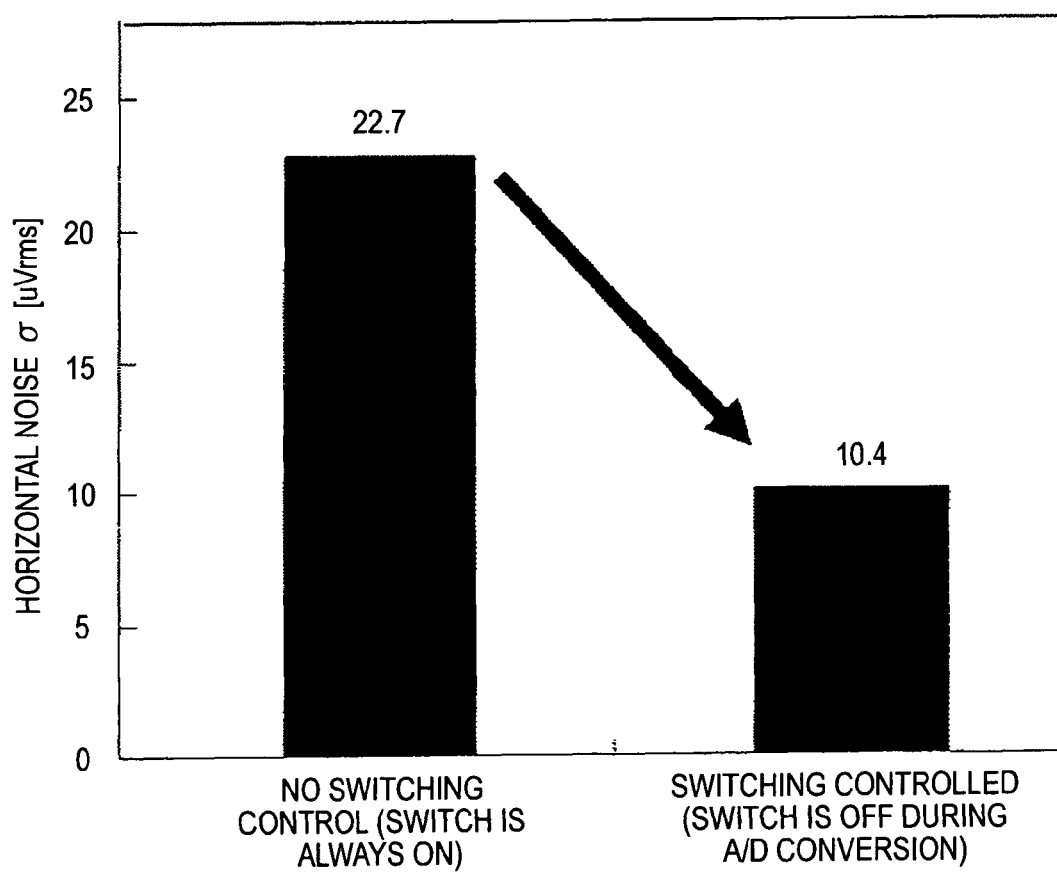
FIG. 10 is a graph showing examples of amounts of horizontal noise appearing on an image in a dark state observed when no switching control is exercised during an A/D conversion period and when switching control is exercised in the A/D conversion period.

By way of example, FIG. 10 shows a graph representing amounts of horizontal noise appearing on an image in a dark state output from a device observed when no switching control is exercised during an A/D conversion period and when switching control is exercised in the A/D conversion period.

As shown in FIG. 10, when the entry of noise from a voltage generating circuit is completely interrupted during an analog signal readout period and an A/D conversion period as seen in the first and second embodiments, the problem of horizontal noise in an output image is mitigated to the same level as encountered when an external capacity is provided.

A solid-state imaging device having such an advantage can be used as an imaging device of a digital camera or video camera.

3. Third Embodiment

Figure 11:
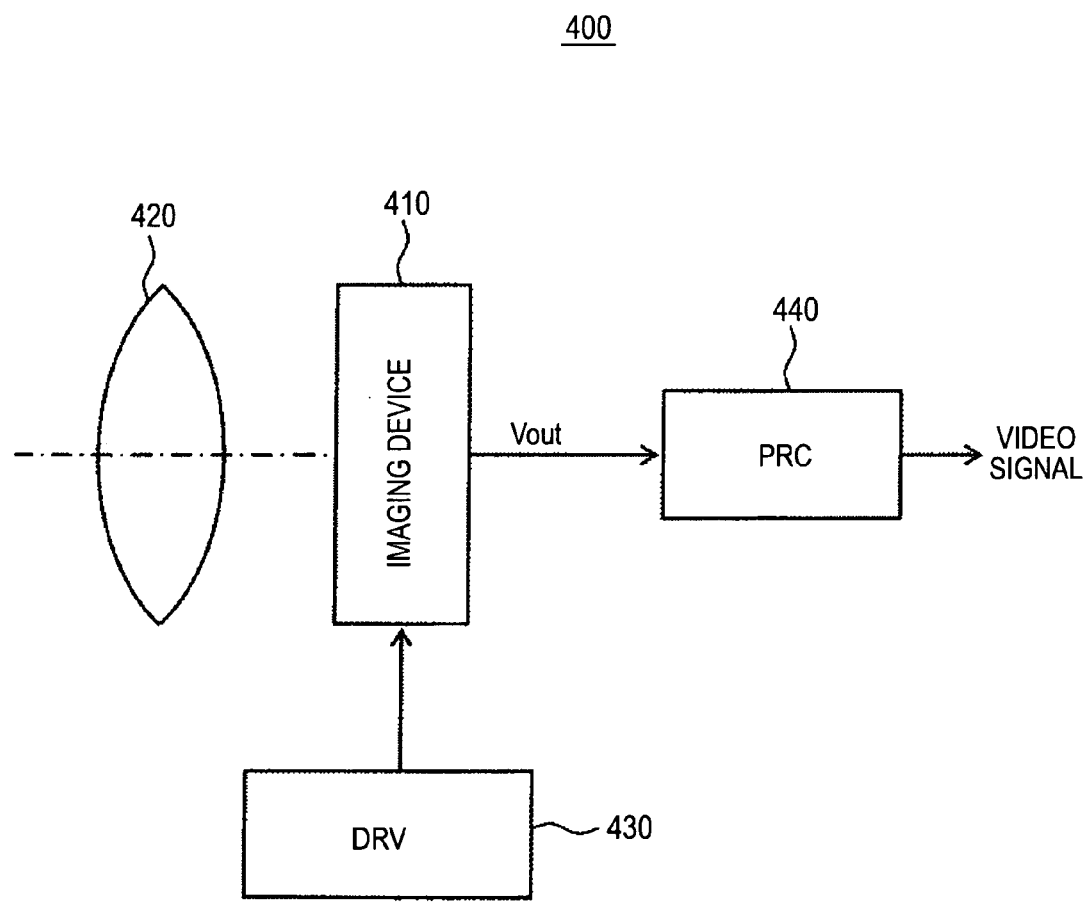
FIG. 11 is a diagram showing an exemplary configuration of a camera system employing a solid-state imaging device according to an embodiment of the invention.

FIG. 11 is a diagram showing an exemplary configuration of a camera system employing a solid-state imaging device according to a third embodiment of the invention.

As shown in FIG. 11, a camera system 400 includes an imaging device 410 which may be a solid-state imaging device 100 or 100A according to the above-described embodiments.

The camera system 400 includes an optical system for guiding incident light to a pixel region of the imaging device 410 (for forming an image of an object). For example, the optical system may be a lens 420 which forms an image of incident light (image light) on an imaging surface.

Further, the camera system 400 includes a driving circuit (DRV) 430 for driving the imaging device 410 and a signal processing circuit (PRC) 440 for processing signals output from the imaging device 410.

The driving circuit 430 includes a timing generator (not shown) generating various timing signals including a start pulse and a clock pulse for driving circuits in the imaging device 410. Thus, the imaging device 410 is driven according to predetermined timing signals.

The signal processing circuit 440 performs predetermined signal processing on signals output from the imaging device 410.

The image signals processed by the processing at the signal processing circuit 440 are recorded in a recording medium such as a memory. A hard copy of image information recorded in the recording medium is made by a printer or the like. The image signals processed by the processing at the signal processing circuit 440 may be displayed as motion pictures on a monitor such as a liquid crystal display.

As described above, the solid-state imaging device 100 or 100A as an imaging device 410 may be incorporated in an imaging apparatus such as a digital still camera, whereby a camera having high fidelity can be obtained.

The present application contains subject matter related to that disclosed in Japanese Priority Patent Application JP 2009-260488 filed in the Japan Patent Office on Nov. 13, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel section including a plurality of pixels performing photoelectric conversion arranged in the form of a matrix;
a pixel signal readout section capable of column-parallel processing including an A/D conversion section configured to read out a pixel signal from the pixel section and perform analog-digital conversion of the pixel signal, the pixels being read in groups;
a voltage sampling section sampling a bias voltage generated by a voltage generating circuit for a sampling period in accordance with a control signal and supplying the sampled bias voltage to the pixel signal readout section; and
a control section controlling the signal readout operation of the pixel signal readout section and the voltage sampling operation of the voltage sampling section, wherein
the pixel signal readout section includes a functional portion operating when supplied with the generated bias voltage,
the control section exercises control such that the sampling period during which a voltage sampling operation of the voltage sampling section is performed is other than a period in which an analog signal is read out and is other than a period in which A/D conversion is carried out, and
wherein the control section is configured to exercise control to vary a timing of the sampling period at which the voltage sampling section samples the bias voltage.

2. A solid-state imaging device according to claim 1, wherein
the voltage sampling section includes a sampling switch provided between the voltage generating circuit and the functional portion of the pixel signal readout section and turned on/off under control of the control signal;
the voltage sampling section supplies the sampled bias voltage to the functional portion after the sampling switch is turned on;
the control section exercises control such that the sampling switch is turned on in a period other than at least either of the period in which an analog signal is read out and the period in which A/D conversion is carried out; and
the control section exercises control such that the sampling switch is turned off in at least either of the period in which an analog signal is read and the period in which A/D conversion is carried out.

3. A solid-state imaging device according to claim 1, wherein the pixel signal readout section includes a load circuit, serving as the functional portion, provided on a signal line for transferring a signal read out from a pixel to the pixel signal readout section; and the bias voltage sampled by the voltage sampling section is supplied to the load circuit.

4. A solid-state imaging device according to claim 1, wherein the pixel signal readout section includes a plurality of comparators each comparing a reference signal that is a ramp wave and an analog signal potential read out from a pixel in a column associated therewith;

counters provided in association with the plurality of comparators capable of counting the comparison time of the respective comparators, the counters stopping counting when the outputs of the respective comparators are inverted, and a plurality of memories holding values counted by the counters;

the comparator includes a differential pair comparing portion formed by transistors, and a current source of the differential pair comparing portion, the differential pair comparing portion and the current source serving as the functional portion; and the bias voltage sampled by the voltage sampling section is supplied to the current source.

5. A solid-state imaging device according to claim 1, wherein the pixel signal readout section includes a reference signal generating portion generating a reference signal that is a ramp wave, a plurality of comparators each comparing the reference signal that is a ramp wave and an analog signal potential read out from a pixel in a column associated therewith;

counters provided in association with the plurality of comparators capable of counting the comparison time of the respective comparators, the counters stopping counting when the outputs of the respective comparators are inverted, and a plurality of memories holding values counted by the counters;

the reference signal generating portion includes a current source for generating a ramp wave as the functional portion; and the bias voltage sampled by the voltage sampling section is supplied to the current source.

6. A method of driving a solid-state imaging device comprising the steps of:

reading out pixel signals from a plurality of pixels of a pixel section, which is formed by a plurality of pixels performing photoelectric conversion arranged in the form of a matrix, the pixels being read in groups;

performing a column-parallel process including an analog-digital conversion function to convert the pixel signals into digital signals;

sampling a bias voltage generated by a voltage generating circuit for a sampling period according to a control signal and supplying the sampled bias voltage to the functional portion involved in at least either of the signal readout step and the column-parallel processing step; and controlling the voltage sampling operation at the voltage sampling step, wherein control is exercised to vary a timing of the sampling period at which the voltage sampling section samples the bias voltage, and control is exercised at the control step such that the sampling period during which the voltage sampling step is performed is other than the analog signal readout period and is other than the A/D conversion period.

7. A method of driving a solid-state imaging device according to claim 6, wherein the voltage generating circuit and the functional portion are connected by a sampling switch which is turned on/off by the control signal; and the control step includes the steps of exercising control such that the sampling switch is on in a period other than at least either of the analog signal readout period and the A/D conversion period; and exercising control such that the sampling switch is off during at least either of the analog signal readout period and the A/D conversion.

8. A camera system comprising:

a solid-state imaging device; and an optical system forming an image of an object on the solid-state imaging device, wherein the solid-state imaging device includes a pixel section formed by a plurality of pixels performing photoelectric conversion arranged in the form of a matrix, a pixel signal readout section capable of column-parallel processing including an A/D conversion section configured to read out a pixel signal from the pixel section and perform analog-digital conversion of the pixel signal, the pixels being read in groups, a voltage sampling section sampling a bias voltage generated by a voltage generating circuit for a sampling period in accordance with a control signal and supplying the sampled bias voltage to the pixel signal readout section, and a control section controlling the signal readout operation of the pixel signal readout section and the voltage sampling operation of the voltage sampling section, wherein the pixel signal readout section includes a functional portion operating when supplied with the generated bias voltage, the control section exercises control such that the sampling period during which a voltage sampling operation of the voltage sampling section is performed is other than a period in which an analog signal is read out and is other than a period in which A/D conversion is carried out, and wherein the control section is configured to exercise control to vary a timing of the sampling period at which the voltage sampling section samples the bias voltage.

9. A solid-state imaging device comprising:

a pixel section including a plurality of pixels arranged in a matrix, each of the plurality of pixels being configured to perform photoelectric conversion;

a pixel signal readout section configured to read out a pixel signal from the pixel section and perform analog-digital conversion of the pixel signal;

a voltage sampling section configured to sample a bias voltage generated by a voltage generating circuit for a sampling period in accordance with a control signal and supply the sampled bias voltage to the pixel signal readout section; and a control section configured to control the signal readout operation of the pixel signal readout section and the voltage sampling operation of the voltage sampling section, the control section being configured to exercise control to vary a timing of the sampling period at which the voltage sampling section samples the bias voltage, wherein the control section is configured to control the voltage sampling operation of the voltage sampling section such that the sampling period during which a voltage sampling operation is performed is other than a period in which an analog signal is read out and is other than a period in which A/D conversion is carried out.

10. The solid-state imaging device according to claim 9, wherein the pixel signal read out section includes a functional portion configured to operate when supplied with the bias voltage.

11. The solid-state imaging device according to claim 10, wherein the voltage sampling section includes a sampling switch provided between the voltage generating circuit and the functional portion of the pixel signal readout section, the sampling switch being turned on/off under control of the control signal;

the voltage sampling section supplies the sampled bias voltage to the functional portion after the sampling switch is turned on;

the control section exercises control such that the sampling switch is turned on in a period other than at a period in which an analog signal is read out and other than a period in which A/D conversion is carried out; and the control section exercises control such that the sampling switch is turned off in a period in which an analog signal is read and the period in which A/D conversion is carried out.

12. The solid-state imaging device according to claim 10, wherein the pixel signal readout section includes a load circuit, serving as the functional portion, provided on a signal line for transferring a signal read out from at least one of the plurality of pixels to the pixel signal readout section; and the bias voltage sampled by the voltage sampling section is supplied to the load circuit.

13. The solid-state imaging device according to claim 9, wherein in the pixel signal readout section, the pixels are read in groups.

14. The solid-state imaging device according to claim 9, wherein the pixel signal readout section includes a plurality of comparators, each of the plurality of comparators being configured to compare a reference signal that is a ramp wave and an analog signal potential read out from at least one of the plurality of pixels in a column associated therewith;

counters provided in association with the plurality of comparators, each of the counters being configured to count the comparison time of the respective comparators, the counters stopping counting when the outputs of the respective comparators are inverted, and a plurality of memories holding values counted by the counters;

wherein each of the comparators includes a differential pair comparing portion formed by transistors, and a current source of the differential pair comparing portion, the differential pair comparing portion and the current source serving as a functional portion; and wherein the bias voltage sampled by the voltage sampling section is supplied to the current source.

15. The solid-state imaging device according to claim 9, wherein the pixel signal readout section includes a reference signal generating portion configured to generate a reference signal that is a ramp wave, a plurality of comparators, each of the plurality of comparators being configured to compare the reference signal that is a ramp wave and an analog signal potential read out from at least one of the plurality of pixels in a column associated therewith;

counters provided in association with the plurality of comparators, each of the counters being configured to count the comparison time of the respective comparators, the counters stopping counting when the outputs of the respective comparators are inverted, and a plurality of memories holding values counted by the counters.

16. The solid-state imaging device according to claim 15, wherein the reference signal generating portion includes a current source for generating a ramp wave as the functional portion, and the bias voltage sampled by the voltage sampling section is supplied to the current source.

17. The camera system comprising:

the solid-state imaging device according to claim 9; and an optical system forming an image of an object on the solid-state imaging device.

* * * * *